CONDUCTIVE STAPLE AND METHOD OF USING SAME

Filed July 5, 1968

INVENTOR.
THOMAS J. STOKES
BY Martin L. Faigus
ATTORNEY.

3,559,147

CONDUCTIVE STAPLE AND METHOD OF USING SAME

Thomas J. Stokes, Philadelphia, Pa., assignor to Elco Corporation, Willow Grove, Pa., a corporation of Delaware Filed July 5, 1968, Ser. No. 742,555
Int. Cl. H01r 13/42
U.S. Cl. 339—18 2 Claims

ABSTRACT OF THE DISCLOSURE

A conductive staple has a body member with an opening therein. A pair of legs are connected to, and project upwardly from the body member, said legs being disposed around the body member 180 degrees from each other. The legs of the staple are inserted through an aperture in a metal connector plate and make an electrical connection between the walls defining said aperture and an electrical contact mounted within said aperture.

This invention relates to a conductive staple for electrically connecting an electrical contact to a metal plate, and to a method for effecting the electrical connection.

Combinational networks which form building blocks for digital computers are sometimes assembled by interconnecting groups of printed circuit boards on which various circuit components are mounted. In such cases, it is conventional to plug each printed circuit board into a connector mounted on the front face of a metal plate which serves to establish a ground plane for the electrical circuits on the printed circuit boards as well as to provide a mechanical support for the assembled printed circuit boards and connectors. Each connector has an insulating casing in which are mounted a plurality of contacts each of which has a tail section that passes through, and extends beyond the rear face of the metal plate upon which the connector is mounted. The tail sections of the contacts are usually square or rectangular in cross-section for permitting conventional automatic back-panel wiring techniques, such as solderless wrapping or the like, to be used to establish the required combinational network and to permit power and signal inputs to be applied to a network as well as signal outputs to be taken therefrom.

To attach the insulating casing of a connector to a metal plate, it is conventional to provide the casing with a series of hubs that project into respective apertures in the metal plate. The hubs may make an interference fit with the walls defining the apertures to hold the insulating casing to the plate. Each hub is apertured to receive the tail section of a contact therethrough. In this manner, each contact is mounted on, but insulated from the metal plate, and the tail section of each contact will project beyond the rear face of said metal plate.

One conventional method for grounding a particular contact to the metal plate is to remove the hub of the insulating casing at the location where the ground is to be made. A metal bushing is substituted for the hub and is securely attached to, and in electrical engagement with the contact. This contact is termed a "ground contact" for reference purposes. The contact with the metal bushing affixed thereto is first pressed into an aperture in the metal plate with an interference fit to make electrical engagement with the walls defining said aperture, and the insulating casing is then assembled to the metal plate with the remaining hubs projecting through respective apertures in the metal plate. In order to replace a defective ground bushing, the insulating casing is separated from the metal plate, the contact with the bushing attached thereto is removed from the aperture in said plate, a new contact and bushing is inserted into such aperture, and the insulating casing is reassembled with said plate.

In apparatus of the type described, each printed circuit board generally requires one or more power inputs, and for this purpose the voltage/ground plane assembly disclosed and claimed in copending application Serial Number 620,-481 filed Mar. 3, 1967 now patent 3,518,610, issued June 30, 1970, and assigned to Elco Corporation, can be utilized. This assembly consists of a voltage plane in the form of a metal plate which underlies a ground plane, and which is separated therefrom by a thin layer of dielectric material. Aligned, but different sized apertures are provided in the ground and voltage planes at the location of each voltage and ground contact. For a ground connection, the aperture in the upper plate constituting the ground plane is smaller; and for a voltage connection, the aperture in the lower plate constituting the voltage plane is smaller. All of the smaller apertures are the same size as are all of the larger apertures. Voltage and ground connections are made by firmly attaching metallic bushings to the contacts, the size of the bushings being somewhat larger than the smaller holes. The bushings, with the contacts preassembled therein, are then inserted into the aligned apertures at each location where a voltage or ground connection is desired. At a ground location, the bushing interferes with the hole in the ground plane, establishing electrical continuity between such contact and the ground plane, while the hole in the voltage plane is larger and clears the bushing. On the other hand, at a voltage location, the hole in the voltage plane interferes to establish electrical continuity between the contact and the voltage plane. This arangement necessitates the removal of hubs from the insulating casing at the location where the ground and voltage connections are to be made. Also, the metallic bushing must be preassembled to the contact prior to its assembly into the metal plate, and in the event that one of the bushings must be replaced, the same procedure must be followed as outlined above with respect to a connector assembled with a single metal plate.

The conductive staple of this invention replaces the metallic bushing for making an electrical connection between an electrical contact mounted in an insulating casing and a metal plate. The staple of this invention can be utilized with an electrical connector mounted on a single metal plate, or with an electrical connector mounted on the voltage/ground plane assembly which is described in said Pat. 3,518,610.

The conductive staple of this invention comprises a body member having an opening therethrough, and a pair of legs attached to said body member and projecting upwardly therefrom, said legs being disposed at 180 degrees from each other. The opening in the body member is adapted to receive the tail section of a contact when the electrical connector is mounted to the metal plate with said tail section extending beyond the rear face of said metal plate. The body member is inserted over the tail section and frictionally engages at least a portion of said tail section. The legs of the conductive staple are forced between the hub of the insulating casing and the walls defining the aperture in the metal plate to make an interference fit with said metal plate. Thus, an electrical interconnection is provided between the contact and the metal plate. When using the conductive staple of this invention with a voltage/ground plane assembly, the legs on the staples will make an interference fit with the walls defining the smaller of the apertures.

In utilizing the conductive staple of this invention, the hubs of the insulating casing are not removed at the locations where an electrical interconnection between a contact and a metal plate is required. Therefore, voltage and ground connections can be made by utilizing standard insulating casings provided with hubs aligned with respective openings in a metal plate without removing hubs in the region where a contact is to be electrically connected to a metal plate.

The conductive staple of this invention is both inserted and removed from the rear side of the metal plate; therefore, the insulating casing and electrical contacts need not be removed from the metal plate in order to remove a defective staple and replace it with a new one.

The staple of this invention can be supplied on a reel by interconnecting the staples by a web portion, and the staple can be inserted into a metal plate by utilizing an air or spring loaded gun. The staple can be fed from the reel and slipped over the tail section of the contact, and the gun can hold the tail section at a preset position and drive the staple into the metal plate.

The more important features of this invention have been outlined rather broadly in order that the detailed description thereof that follows may be better understood, and in order that the contribution to the art may be better appreciated. There are, of course, additional features of the invention that will be described hereinafter and will also form the subject matter of the claims appended hereto. Those skilled in the art will appreciate that the conception upon which this disclosure is based may be readily utilized as a basis for designing other structures for carrying out the several purposes of this invention. It is important, therefore, that the claims to be granted herein shall be interpreted to have sufficient breadth to prevent the appropriation of this invention by those skilled in the art.

For an understanding of the invention, reference is made to the following detailed description which should be consider in connection with the accompanying drawings wherein.

Figure 1:
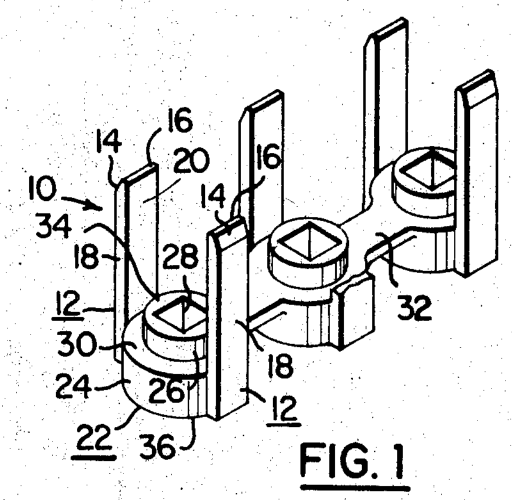
FIG. 1 is a perspective view of a series of conductive staples interconnected by a web portion, a portion of a leg of one staple being broken away to show details of construction.

Referring now to the drawings, FIG. 1 shows details of construction of the conductive staple 10 of this invention. Each conductive staple 10 comprises a body member 22, and a pair of upwardly projecting legs 12 attached to said body member and disposed around said body member at an angle of 180 degrees from each other. The body mem- 22 comprises a cylindrical low section 24 and a concentric upper cylindrical hub 26. The junction between the lower section 24 and the cylindrical hub 26 defines an upwardly facing shoulder 30, the function of which will be described hereinafter. An opening 28 is provided in the body member 22 and extends through the upper surface 34 of cylindrical hub 26, and the lower surface 36 of lower section 24. The opening is preferably square in cross-section, to receive a tail section therethrough which is also square in cross-section; however, the opening can have other configurations.

Each leg 12 of the conductive staple 10 is comprised of an outer surface 18, an inner surface 20, and an upper surface 16. The upper surface 16 is interconnected with the outer surface 18 by a chamfered surface 14, the function of which will be discussed infra. In the preferred embodiment of this invention, the legs are integrally molded with the body member 22 of the conductive staple; however, it is understood that the legs 12 can be attached to body member 22 by any other suitable means. It is also understood that the staple can be made from any suitable conductive material such a beryllium copper, phosphor bronze, or aluminum.

FIG. 1 shows a series of three conductive staples interconnected by web portions 32 to indicate the manner in which a plurality of such staples can be interconnected, and subsequently wound upon each other to form a reel of such conductive staples.

Figure 4:
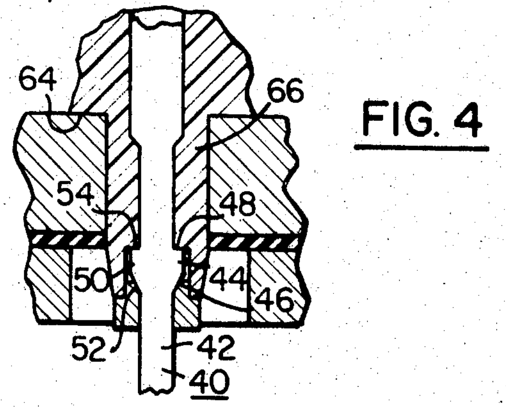
FIG. 4 is a section taken along line 4—4 of FIG. 2.

The conductive staple of this invention is utilized to make an electrical connection between an electrical contact of electrical connector 60 (FIGS. 2 and 4), and a metal plate 82. Such an electrical contact may be comprised of a tail section 40 (FIG. 4) which has a straight post 42 of square cross-sectional terminating in barbs 44 and 50. The barb 44 has an inclined surface 46 terminating in an upwardly facing shoulder 48, and the barb 50 has an inclined surface 52 terminating in upwardly facing shoulder 54.

The electrical connector 60 comprises an insulating casing 62 having a bottom surface 64 integrally formed with downwardly projecting hubs 66. An aperture 68 extends through the hub 66 and bottom surface 64 of the insulating casing 62 to permit the tail section 40 of the contact to pass through said insulating casing 62. The lower portion of hub 66 is provided with a counterbore 72 which defines a downwardly facing shoulder 73 at its junction with aperture 68.

Figure 2:
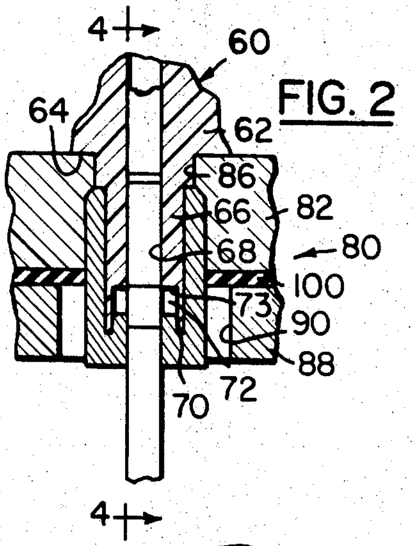
FIG. 2 is a sectional view showing the conductive staple of this invention electrically connecting an electrical contact to the ground plane of a voltage/ground phase assembly.

FIG. 2 shows the conductive staple of this invention providing an electrical connection between a contact of electrical connector 60, and the ground plane 82 of a voltage/ground plane assembly 80. A hub 66 of insulating casing 62 is inserted into aligned apertures 86 and 90 in the ground plane 82 and voltage plane 88, respectively. The ground plane 82 is separated from the voltage plane 88 by an insulating layer 100, and the aperture 86 has a smaller dimension than the aperture 90 whereby the legs 12 of conductive staple 10 will make an interference fit with the walls defining aperture 86, and will clear the walls defining aperture 90. The staple 10 is firmly held in assembled position by an interference fit between the walls defining opening 28 and inclined surfaces 46 and 52 which, in part, define barbs 44 and 50 respectively. Additional retention is provided by the interference fit of the legs 12 with the walls defining aperture 86. The lower surface 70 of the hub 66 may abut against upwardly facing shoulder 30 of the conductive staple 10 to properly position said conductive staple with respect to the voltage/ground plane assembly 80. The chamfered surfaces 14 on legs 12 provide a lead-in portion which facilitates the entry of legs 12 between the hub 66 and the walls defining aperture 86.

Figure 3:
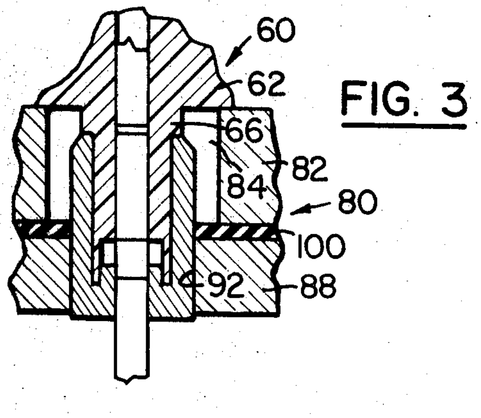
FIG. 3 is a sectional view showing the conductive staple of this invention electrically connecting an electrical contact to the voltage plane of a voltage/ground plane assembly.

FIG. 3 is similar to FIG. 2 but shows the conductive staple 10 of this invention providing an electrical connection between an electrical contact and the voltage plane 88 of the voltage/ground plane assembly 80. An aperture 84 in ground plane 82 is larger than its aligned aperture 92 in voltage plane 88. Therefore, when the conductive staple 10 is inserted from the bottom surface of voltage plane 88, the legs 12 will make an interference fit with the walls defining aperture 92, but will clear the walls defining aperture 84 to make an electrical connection between the contact and the voltage plane 88.

When a staple must be replaced it is removed through the bottom surface of the metal plates, and, therefore, the electrical connector does not have to be removed. A new staple can then be inserted with the legs of the new staple engaging portions of the walls defining the aperture in the metal plate which were not engaged by the legs of the original staple.

A modified staple can be provided with an upstanding cylindrical extension attached to the body member 22, in lieu of the individual legs 12.

Figure 5:
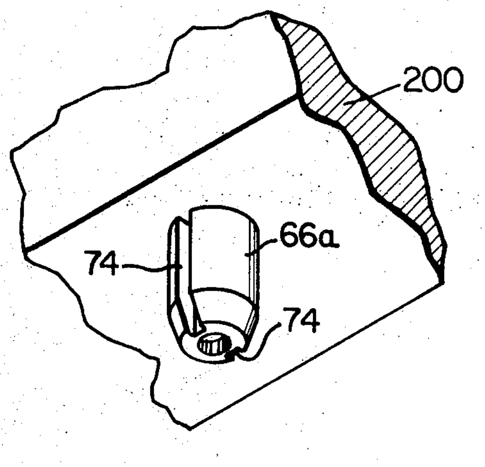
FIG. 5 is a perspective view of a portion of an insulating casing showing the construction of a modified hub.

FIG. 5 shows a modified hub construction which can be utilized on the electrical connector. This hub **66*a* has a pair of elongated channels 74 formed in the outer periphery thereof, and disposed at 180 degrees from each other. These channels can accommodate the legs 12 of the staple and, therefore, provide less resistance to the insertion of the staple into the aperture in the plate 200** than is the case when a hub is utilized which does not have such channels. If desired, a plurality of pairs of channels can be formed in the hub to accommodate the legs of replacement staples which may be inserted into an aperture in the metal plate.

I claim:

1. An electrical connector and metal plate assembly comprising:

(a) an insulating casing having a bottom surface from which a downwardly extending hub projects;

(b) a contact mounted within said insulating casing and having a tail section which projects through an aperture in said bottom surface of said insulating casing and said hub;

(c) a metal plate having upper and lower surfaces and an aperture extending through said plate to interconnect each of said last mentioned surfaces;

(d) the hub of said casing being positioned in said aperture in said plate and frictionally engaging the walls defining said aperture; and (e) a conductive staple including a body member having an upper and a lower surface, and having an opening extending through said body member to interconnect each of said last mentioned upper and lower surfaces, said opening receiving said tail section of said contact, said opening being defined by walls that make electrical and mechanical connection with said tail section of said contact;

(f) said staple including connection means attached to said body member and projecting upwardly therefrom and making an interference engagement with said walls defining said aperture for establishing an electrical connection with said metal plate.

2. An electrical connector and metal plate assembly, comprising:

(a) an insulating casing having a bottom surface from which a downwardly extending hub projects;

(b) a contact mounted within said insulating casing and having a tail section which projects through an aperture in the bottom surface of the insulating casing and said hub;

(c) upper and lower superimposed metal plates separated by an insulating layer, said plates having aligned but different sized apertures therethrough, said insulating layer having an aperture therethrough which is aligned with said apertures of said plates;

(d) the hub of said casing being positioned within said aligned apertures of said plates and said insulating layer and frictionally engaging the smaller of said aligned apertures of said plates; and (e) a conductive staple including a body portion having an upper and a lower surface and having an opening passing through the last mentioned upper and lower surfaces and receiving said tail section of said contact, said opening being defined by walls that make electrical and mechanical connection with said tail section of said contact;

(f) said staple including connection means attached to said body member and projecting upwardly therefrom and making an interference engagement with the walls defining the smaller of said aligned apertures.

References Cited

UNITED STATES PATENTS

| | | | |
|---|---|---|---|
| 2,869,090 | 1/1959 | Johanson | 339—17 |
| 2,995,617 | 8/1961 | Maximoff et al. | 339—221(M) |
| 3,341,943 | 9/1967 | Gwyn, Jr. | 29—630(C) |
| 3,445,803 | 5/1969 | Johnston et al. | 339—17 |

ERNEST R. PURSER, Primary Examiner

P. A. CLIFFORD, Assistant Examiner

U.S. Cl. X.R.

339—17, 221